United States Patent
Ishiguro (10) Patent No.: US 7,599,145 B2
(45) Date of Patent: Oct. 6, 2009

(54) STORAGE MEDIUM DEVICE, DEFORMATION CONTROLLER AND HEAD SLIDER

(75) Inventor: Takehiro Ishiguro, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/034,814

(22) Filed: Feb. 21, 2008

(65) Prior Publication Data

US 2008/0212227 A1 Sep. 4, 2008

(30) Foreign Application Priority Data

Mar. 2, 2007 (JP) ............... 2007-053152

(51) Int. Cl.
*G11B 5/55* (2006.01)
(52) U.S. Cl. .................... 360/78.05; 360/75
(58) Field of Classification Search ........... None
See application file for complete search history.

(56) References Cited

U.S. PATENT DOCUMENTS 6,078,476 A * 6/2000 Magee et al. ........... 360/78.05
6,487,045 B1 11/2002 Yanagisawa
6,522,494 B1 * 2/2003 Magee ..................... 360/75
6,928,722 B2 8/2005 Yanagisawa
7,082,671 B2 8/2006 Yanagisawa
7,489,464 B1 * 2/2009 McNab et al. ............ 360/75

FOREIGN PATENT DOCUMENTS

| JP | 04356785 A | * | 12/1992 |
| JP | 09022519 A | * | 1/1997 |
| JP | A 2000-348321 | | 12/2000 |
| JP | A 2002-157850 | | 5/2002 |

* cited by examiner

*Primary Examiner*—Hoa T Nguyen
*Assistant Examiner*—James L Habermehl
(74) *Attorney, Agent, or Firm*—Greer, Burns & Crain, Ltd.

(57) ABSTRACT

A storage medium device has at least one head which includes a read head element and a write head element. The device has a deformable element which changes a distance between the read head element and the write head element in a circumferential direction, a storage unit which stores a control value to be applied to the deformable element in association with each target track for writing, and a deformation controller which acquires the control value corresponding to the target track for the writing from the storage unit, and applies the acquired control value to the deformable element.

15 Claims, 12 Drawing Sheets

| TARGET TRACK | CONTROL VALUE |
|---|---|
| 1 TO 200 | 24 |
| 201 TO 400 | 23.9, 38.4 |
| 401 TO 600 | 23.8, 38.3 |
| ⋮ | ⋮ |

STORAGE MEDIUM DEVICE, DEFORMATION CONTROLLER AND HEAD SLIDER

BACKGROUND

1. Field

The present technique relates to a storage medium device which can stably be operated regardless of change in a yaw angle, a deformation controller and a head slider both for use in the storage medium device.

2. Description of the Rated Art

The currently used magnetic disk devices employ a rotary actuator (VCM: Voice Coil Motor) as a mechanism for moving heads. Due to this configuration, a relative angle of a flying head slider (hereinafter referred to as a yaw angle), changes in accordance with a radius position of the disk medium on which its head is positioned. The change in the yaw angle has an effect on the positioning control of the head.

That is, in the currently used magnetic disk devices, a read head element and a write head element are separated, and the radius position of the head is controlled by means of reading servo information, in order for the write head element to be "on-track" on a target track for writing at a writing operation. However, if the yaw angle changes in accordance with the radius position in which the head is positioned, the relative distance between the read head element and the write head element in a radial (cross-track) direction changes with the change in the yaw angle.

The conventional magnetic disk devices use a storage medium in which magnetic particles are continuously located. Thus, the read head element can be offset to an arbitrary amount from a target track in a cross-track direction, in accordance with the radius position of the target track for the writing. Further, the write head element can be on-track accurately on a target track by adjusting offset, amount.

However, in recent years, patterned media or discrete media in which magnetic particles are separated for each track have been put to practical use, for achieving high-density data storage. When any of such storage media is used, there is a disadvantage, both read head and write head can not be on-track at the same time because the tracks are separated in physically and magnetically.

It is considered that an effective technique is to change the distance between the read head element and the write head element, in accordance with the radius position of the target track for writing. This technique is particularly effective in order to control the write head element to stably be on-track on the target track on a magnetic disk using the storage medium wherein the magnetic particles are separated for each track.

If the distance between the read head element and the write head element is changed in accordance with the radius position of the target track for the writing, the read head element can be controlled to be on-track on any track while the write head element, is on-track on the target track. For example, Japanese Patent Application Laid-open (JP-A) Nos. 2000-348321 and 2002-157850 disclose techniques for changing a head part of a magnetic disk device.

However, the technique disclosed in JP-A-2000-348321 is to deform a slider of a magnetic head, not to change a distance between a read head, element and a write head element. According to the technique disclosed in JP-A-2002-157850, a shear-type deformable element is used so as to control the read head element and the write head element to be on the same track. It is quite difficult, to control the relative position of the read head element and the write head element in a cross-track direction with a required accuracy and with a required amount.

The present technique has been made to solve the above problems of the conventional techniques. It is therefore an object of the present technique to provide a storage medium device which can stably be operated regardless of change in a yaw angle, and a deformation controller and head slider both for use in the storage medium device.

SUMMARY

In keeping with one aspect of an embodiment of this technique, a storage medium device has at least a head which includes a read head element and a write head element that are adjacently arranged. The device includes a deformable element which changes a distance between the read head element and the write head element in a circumferential direction, a storage unit, which stores a control value to be applied to the deformable element in association with each target track for writing, and a deformation controller which acquires the control value corresponding to the target track for the writing from the storage unit, and applies the acquired control value to the deformable element.

DETAILED DESCRIPTION OF THE PREFERRED EMBODIMENTS

1. First Embodiment

Figure 1:
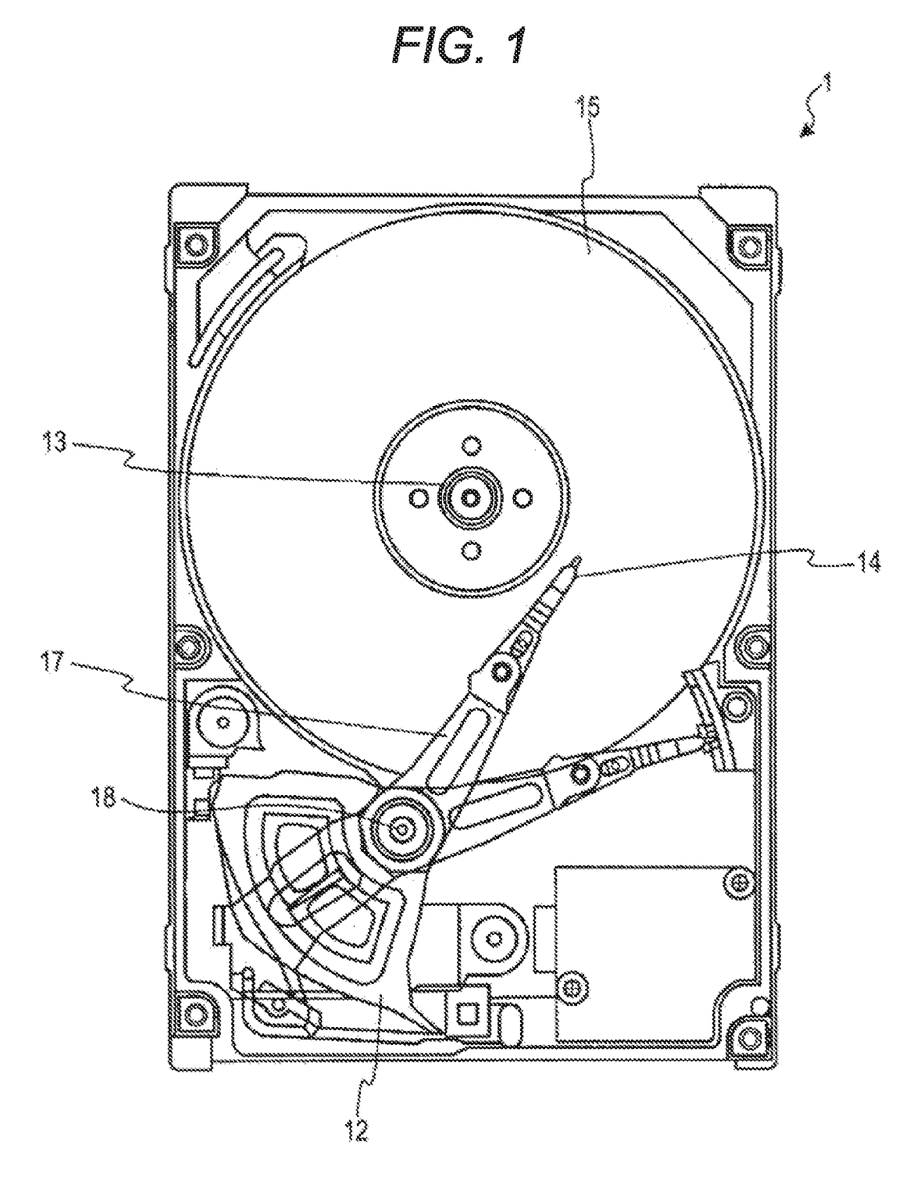
FIG. 1 is a cross sectional view of a magnetic disk device according to a first embodiment.

Descriptions will now be made to a method for controlling deformation of a head according to a first embodiment; FIG. 1 is a cross sectional view of a magnetic disk device 1 according to this embodiment. In the illustration, magnetic disks 15 are storage media, which store various information, and are rotationally driven by a spindle motor (hereinafter referred to as an "SPM") 13.

Heads 14 perform reading and writing operations, and are provided at one end of arms 17. The heads 14 implement reading and writing operations, while maintaining a state of being slightly floated above the surfaces of the magnetic disks 15 by the lift which occurs as a result of the rotation of the magnetic disks 15. The heads 14 move in a cross-track direction by the drive of a VCM 12 provided on the other end of the arms 17, so as to change a target track for reading and writing.

In this case, the heads 14 do not horizontally move, but rather move about an axis 18 in a circumferential direction. Thus, the yaw angle (relative angle) of the tracks and the heads 14 varies according to the target track.

Figure 2:
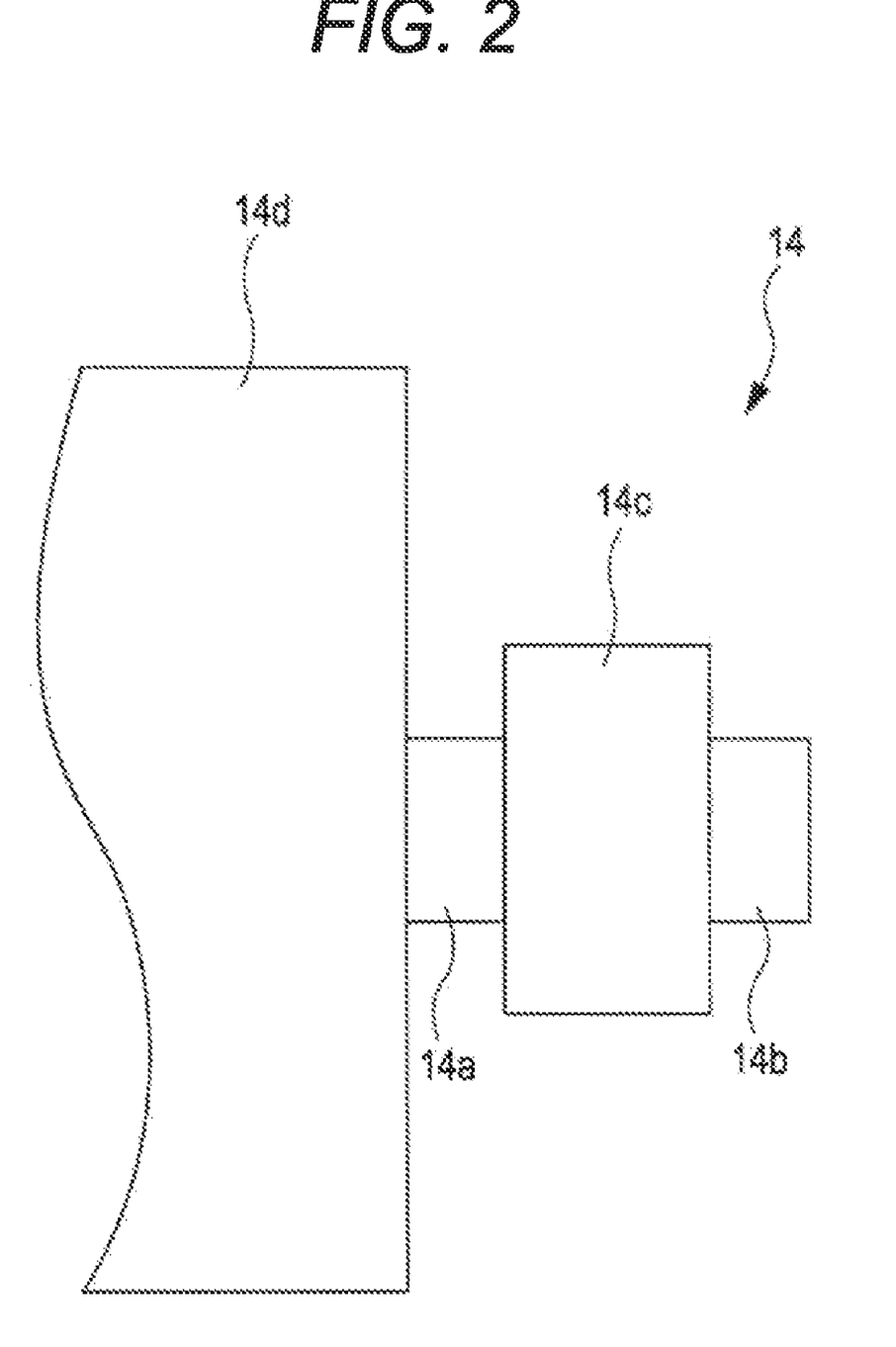
FIG. 2 is an exemplary diagram of a read head element and a write head element.

The heads 14 have a configuration exemplarily shown in FIG. 2 so as to stably realize the positioning control, regardless of the change in the yaw angle. That is, the heads 14 each include a read head element 14a for reading data and a write head element 14b for writing data (which are arranged sequentially in an air outflow direction of the air bearing surface of a head slider 14d) and a deformable element 14c which are formed therebetween.

The deformable element 14c changes the distance between the read, head element 14a and the write head element 14b by deforming itself in a front-back direction of the head sliders. For example, the deformable element is piezoelectric actuator which is formed of PZT (lead zirconium titanate), etc. The deformable element 14c may be formed of a material which deforms by the effect of thermal-expansion, electrostriction, magnetostriction, etc.

As a result of the deformation of the deformable elements, the write head elements 14b move toward and backward the air outflow end relative to the read head element 14a so as to change the relative distances in the circumferential direction. That is, in this example, the distances between the read head elements 14a and the end surfaces of the bases of the head sliders 14d are not changed, while the distances between the write head elements 14b and the end surfaces of the bases of the head sliders 14d are changed.

Figure 3:
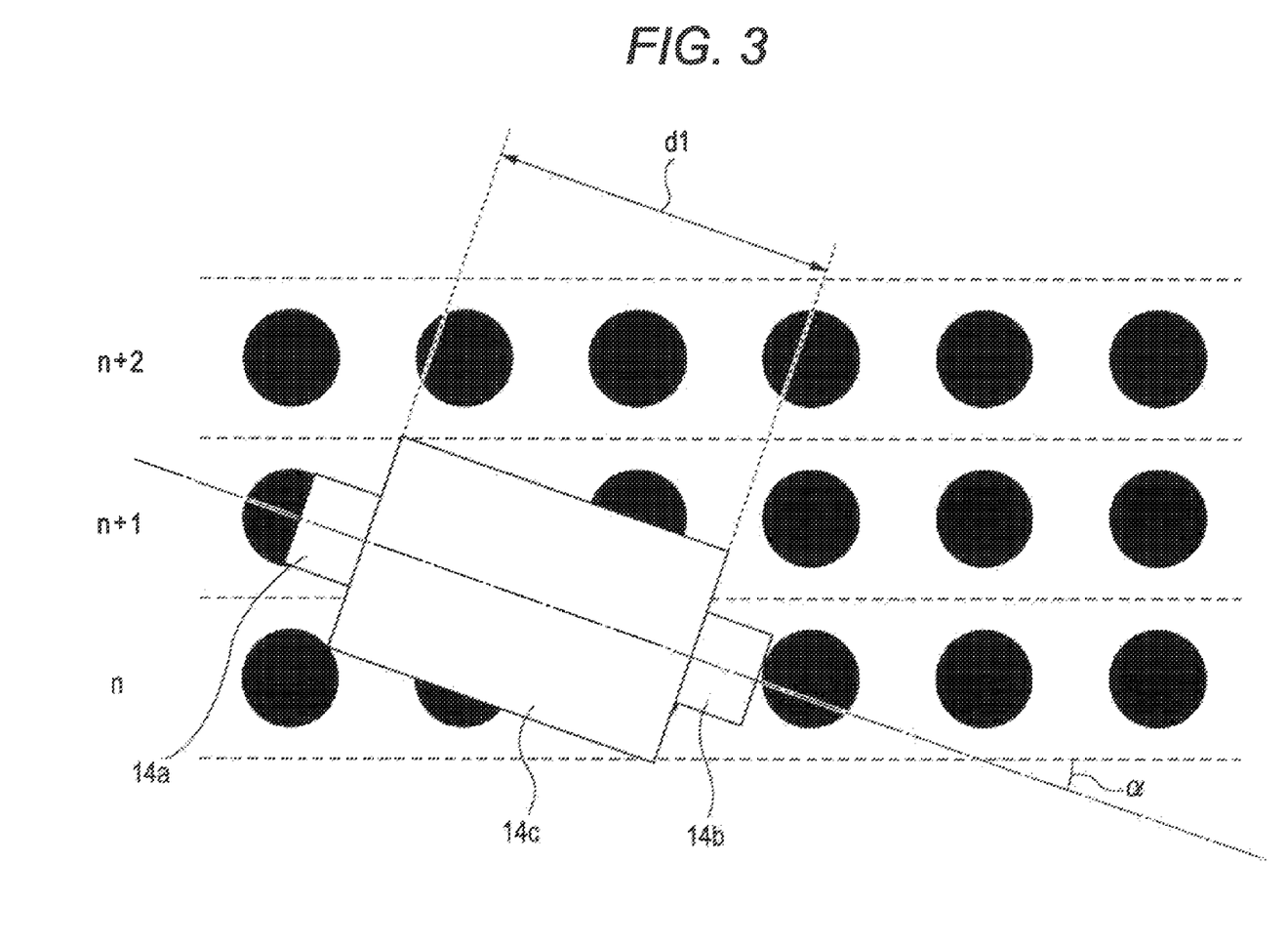
FIG. 3 is a diagram showing a state of a head in a case where writing is performed on a track "n"

Descriptions will now be made to a specific example of a method for controlling the positions of the heads 14 by deforming the deformable element 14c. FIG. 3 is a diagram showing a state of the head 14 in a case where writing is performed on a track "n". In the illustration, the magnetic disk 15 is a patterned medium. In the disk 15, the magnetic particles are independently arranged both in a circumferential direction (also called a track direction or down-track direction) along which tracks are formed and in a cross-track direction (track crossing direction).

In FIG. 3, the write head element 14b is on-track on the target track "n" for writing. The yaw angle of the head is α. The read, head element 14a is on-track on a track "n+1" so as to stably control the write head element 14b to be on-track on the track "n". In order for both of the read head element 14a and the write head element 14b to be on-track, the deformable element 14c is so controlled as to obtain a distance "d1" between the read head element 14a and the write head element 14b.

Figure 4:
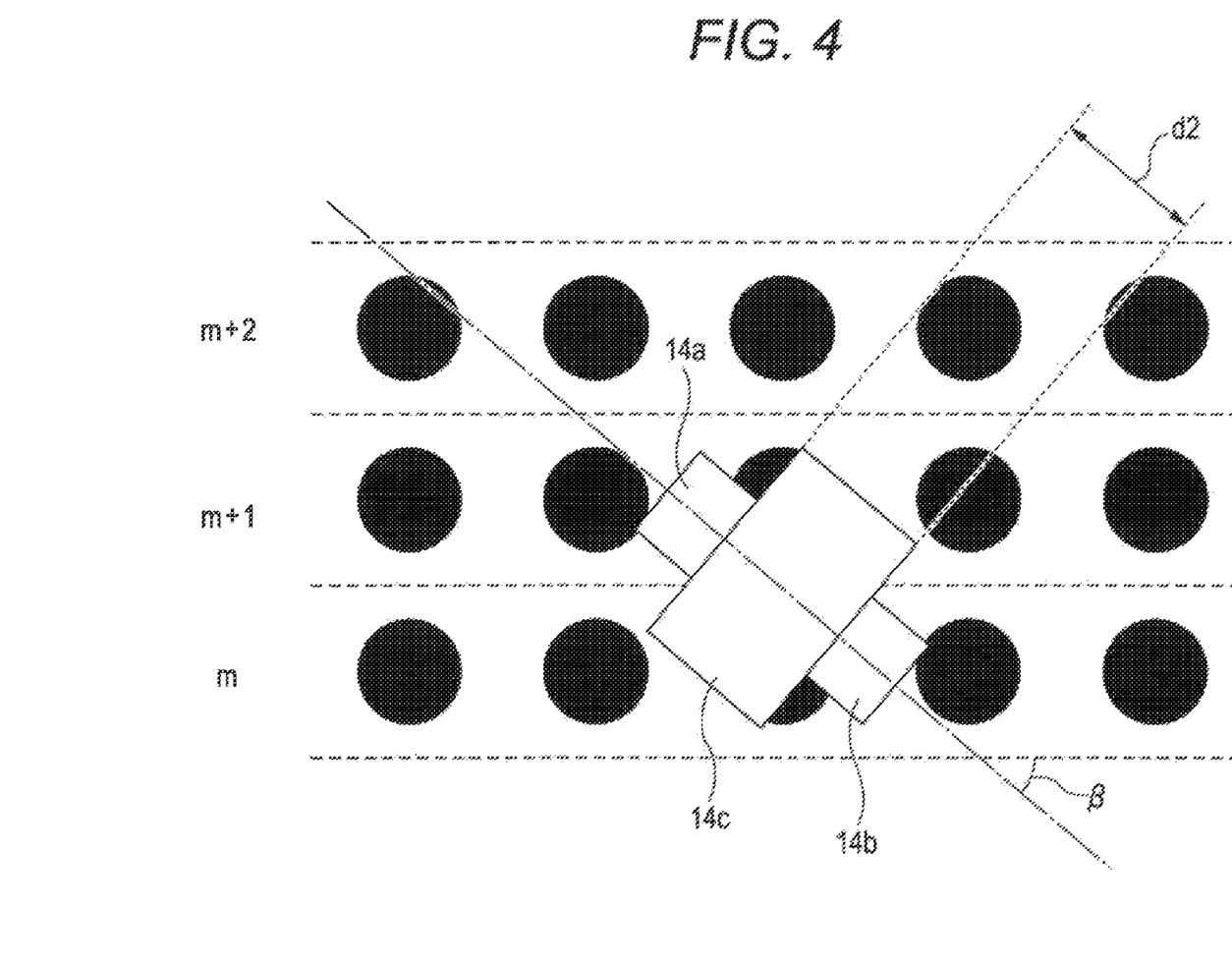
FIG. 4 is a diagram showing a state of a head in a case where writing is performed on a track "m"

FIG. 4 is a diagram showing the state of the head 14 in a case where writing is performed on the track "m". In the illustration, the write head element 14b is on-track on the target track "m" for writing. The yaw angle of the head is β. The read head element 14a is on-track on a track "m+1" so as to stably control, the write head element 14b to be on-track on the track "m". In order for both of the read head element 14a and the write head element 14b to be on-track, the deformable element 14c is so controlled as to obtain a distance "d2" between the read head element 14 a and the write head 14b.

As shown in FIGS. 3 and 4, the deformable element 14c are deformed, in accordance with the radius positions of the target tracks for writing, and the distances between the read head elements 14c and the write head elements 14b are changed. As a result, both the read head elements 14a and the write head elements 14b can be on-track.

It is not necessary that the read head element 14a and the write head element 14b be arranged in a straight line as shown in the illustration.

For positioning control, the read head elements read servo information of servo sectors (not illustrated in FIGS. 3 and 4).

It is necessary to control the write head elements 14b to be on-track on the target track for writing at a writing operation. At this time, the read head elements 14a are also controlled to be on-track on any track. As a result, the read head elements 14a can securely read the servo information, etc., and the write head elements 14b can be controlled to be on-track on the target track for writing.

In a patterned media, the magnetic particles (dots) are independently arranged also in a circumferential direction. Thus, the write head elements 14b need to perform a writing operation on the magnetic particles at a right timing. This timing is controlled by the write-clock signal, generated in synchronism with the read signal as the read head reads the magnetic particles. The read head elements 14a are controlled to be on-track on any track, at this timing. As a result, the write-clock can be synchronized exactly with the user data and the write head elements 14b can improve the accuracy of writing.

Figure 5:
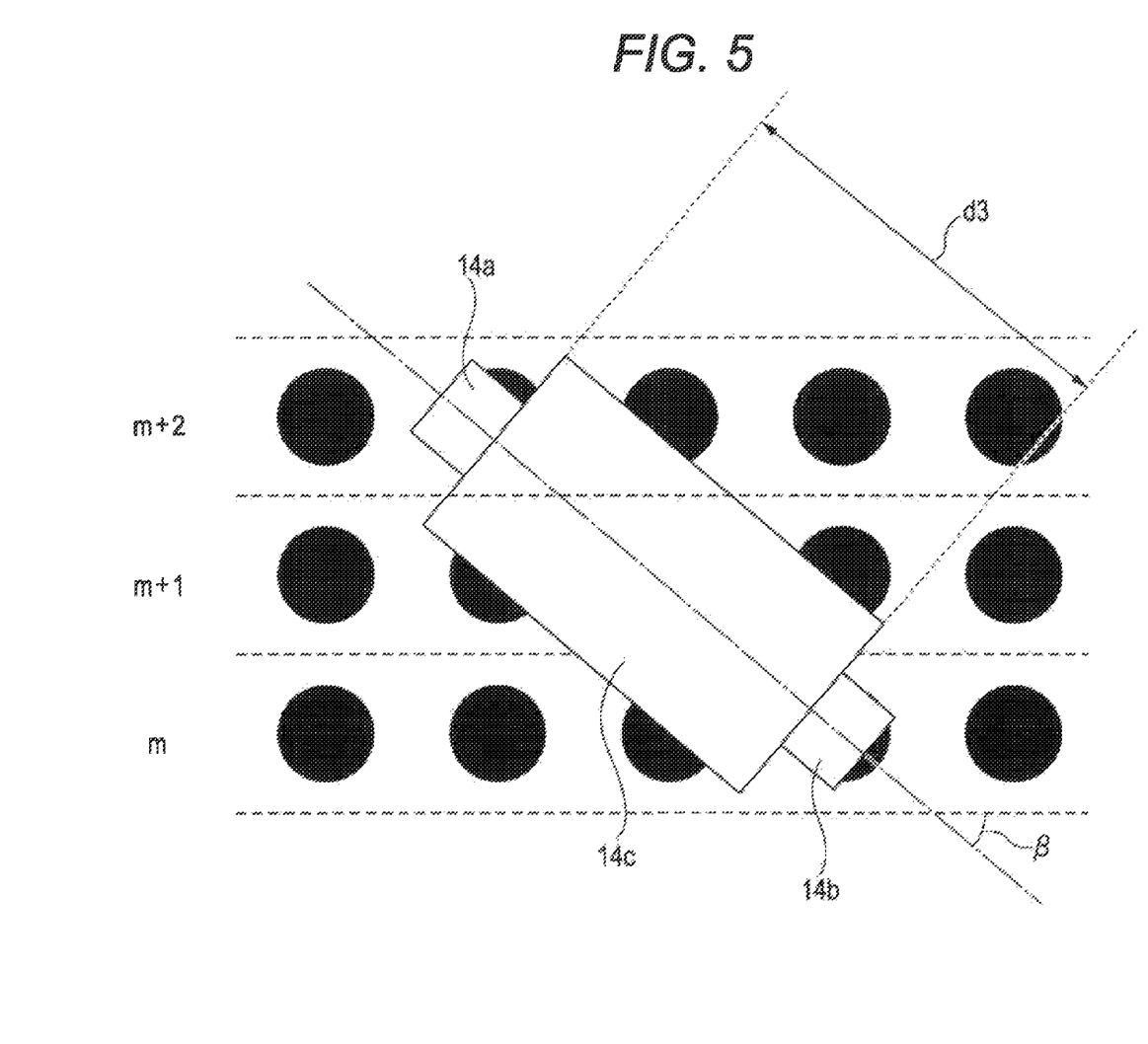
FIG. 5 is another diagram showing a state of a head in a case where writing is performed on the track "m"

In the example of FIGS. 3 and 4, the read head element 14a and the write head element 14b are on-track on adjacent tracks, by deforming the deformable element 14c. However, it is not necessary to control both of the head elements to be on-track on the adjacent tracks. As shown in FIG. 5, the head elements may be on-track over one or more than one track, or may be on-track on the same track.

Figure 6:
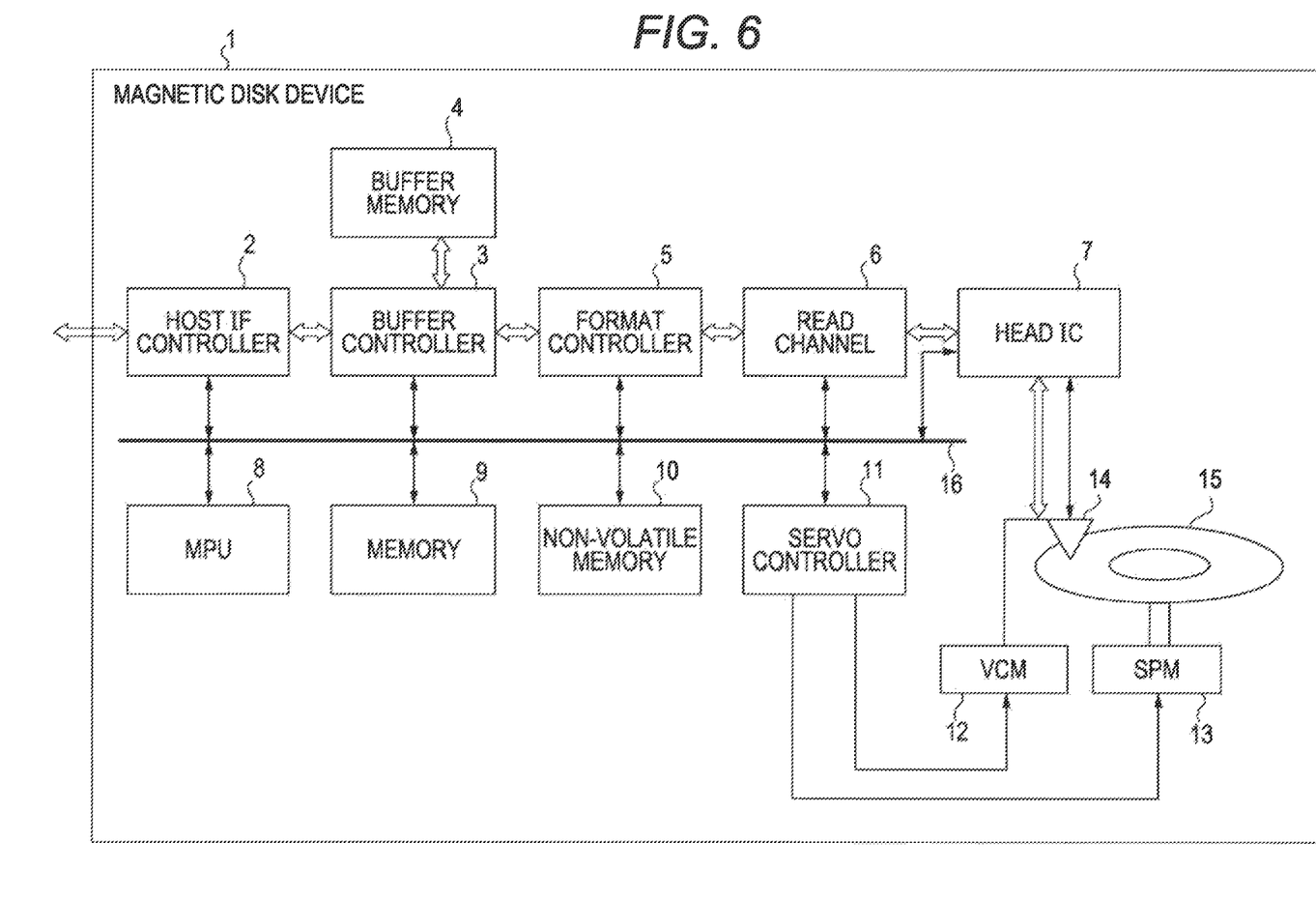
FIG. 6 is a block diagram showing a schematic configuration of the magnetic disk device according to the first embodiment.

Descriptions will now be made to a configuration of the magnetic disk device 1. FIG. 6 is a block diagram showing a schematic configuration of the magnetic disk device 1. As shown in the illustration, the magnetic disk device 1 comprises a host interface controller (hereinafter referred to as a "host IF controller") 2, a buffer controller 3, a buffer memory 4, a format controller 5, a read channel 6, a head IC 7, a micro processing unit (MPU) 8, a memory 9, a non-volatile memory 10, a servo controller 11, a VCM 12, an SPM 13, a head 14, a magnetic disk 15 and a shared bus 16.

The host IF controller 2 is connected to the host which is an upper level device of the magnetic disk device 1, and controls communication with the host. The buffer controller 3 controls the buffer memory 4. The buffer memory 4 temporarily stores information which is transmitted between the host and the magnetic disk device 1.

The format controller 5 controls a data reading operation, and checks errors of the read data. The read channel 6 amplifies a data signal output from the head IC 7, at the reading operation of data, and performs a predetermined process, such as AD conversion, demodulation, etc. The head IC 7 includes a preamplifier (not shown) so as to preamplify the data signal read by the head 14.

The MPU 8 is the main control system for the magnetic disk device 1 in accordance with a predetermined program (firmware program). That is, the MPU 8 decodes commands sent from the host so as to control each of the processing units, and generally controls the reading and writing of data from and to the magnetic disks 15. In this embodiment, the MPU 8 controls the deformable element 14c included in the heads 14 to change the distances between the read head elements 14*a* and the write head elements 14*b*.

Note that the MPU 8 may be a micro controller unit (MCU) or a central processing unit (CPU).

The memory 9 and the non-volatile memory 10 store firmware programs operating on the MPU 8 or various control data. The servo controller 11 checks the operation state of the VCM 12 and SPM 13, and at the same time drives the motor thereof. The shared bus 16 connects each of the processing units of the magnetic disk device 1, and receives and sends various information therebetween.

Figure 7:
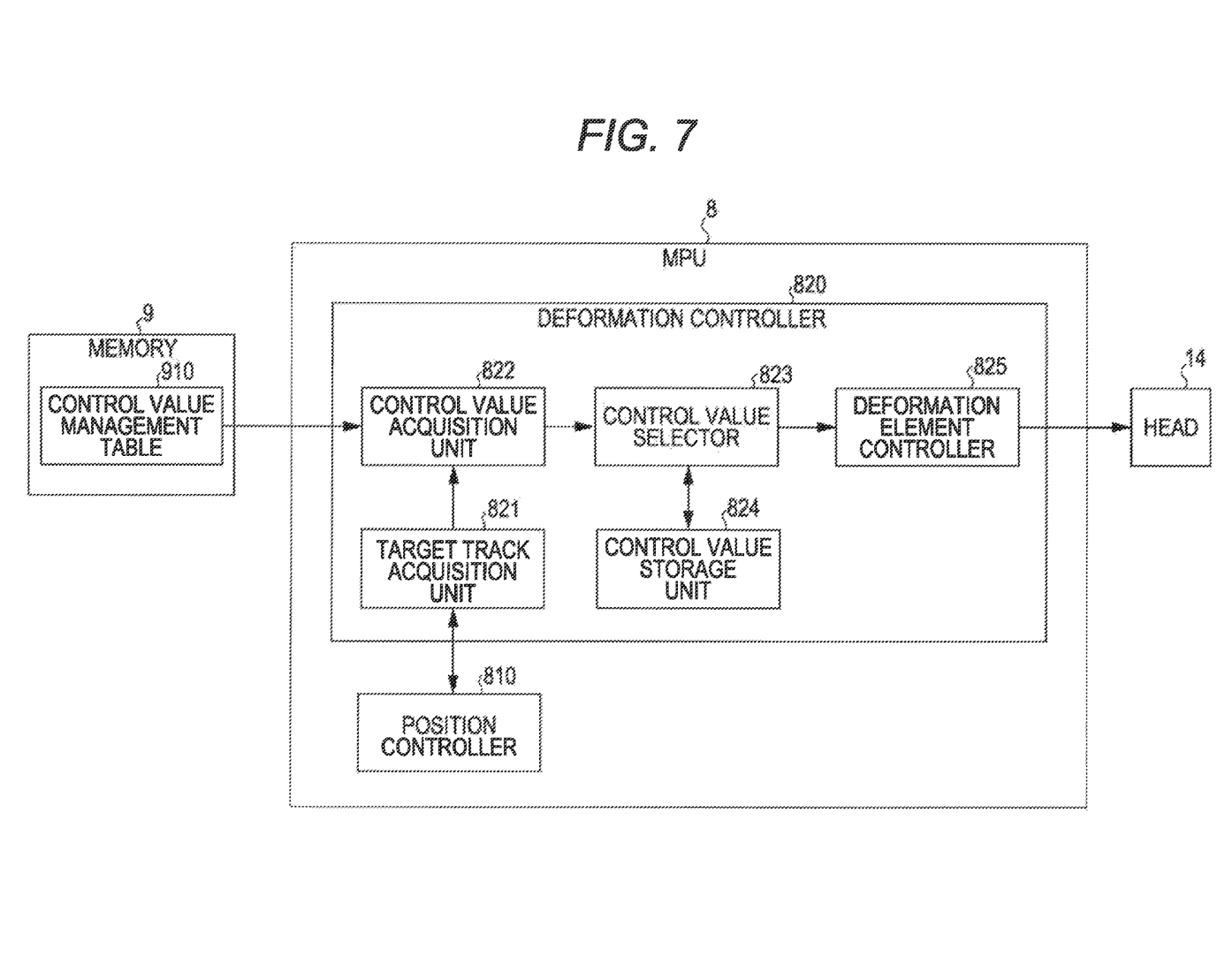
FIG. 7 is a diagram showing a configuration of the main part of the magnetic disk device according to the first embodiment.

FIG. 7 is a diagram showing a configuration of the main part of the magnetic disk device 1 according to this embodiment. As shown in the illustration, the MPU 8 includes a position controller 810 and a deformation controller 820. The position controller 810 controls the heads 14 to be in a target position corresponding to the writing and reading operations.

The function of the deformation controller 820 is to control the deformable elements 14*c* of the heads 14 so as to change the distances between the read head elements 14*a* and the write head elements 14*b*, in accordance with the radius position in which the heads 14 are positioned. The controller 820 includes a target track acquisition unit 821, a control value acquisition unit 822, a control value selector 823, a control value storage unit 824 and a deformable element controller 825.

The function of the target track acquisition unit 821 is to acquire a target track for writing, from the position controller 810. The control value acquisition unit 822 acquires a control value of the deformable element 14*c* corresponding to the track acquired by the target track acquisition unit 821, by referring to a control value management table 910 stored in the memory 9.

Figure 8:
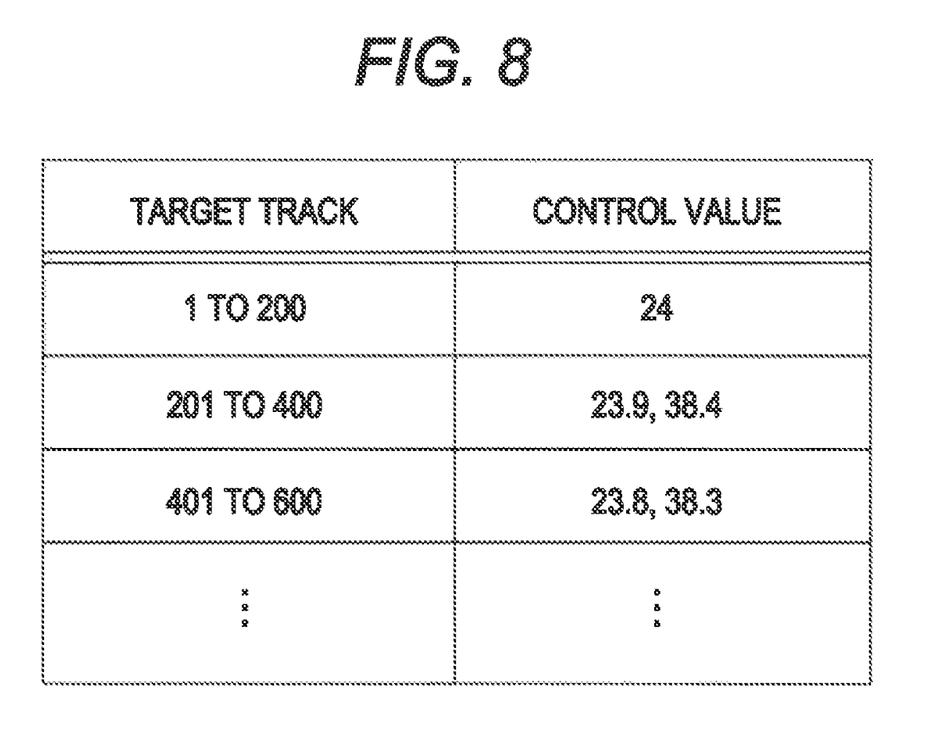
FIG. 8 is a diagram showing an example of a control value management table.

FIG. 8 shows an example of the control value management table 910. As shown in the illustration, the control value management table 910 is configured to keep one or a plurality of control values of the deformable element 14*c* in association with target tracks for writing. When the write head elements 14*b* are controlled to be on-track on a predetermined track, the read head elements 14*a* may be able to be on-track on some tracks within the operation range of the deformable element 14*c*. The control value management table 910 keeps the some control values of the deformable elements 14*c* that are necessary for controlling the read head elements 14*a* to be on-track on each of the tracks, in association with the target tracks for writing.

The control value management table 910 is originally stored in the non-volatile memory, and is loaded from the non-volatile memory 10 to the memory 9 at the activation of the magnetic disk device 1, in order to realize high-speed access from the MPU 8.

Referring back to FIG. 7, the control value selector 823 selects a lowest control value of deformation, from the control values acquired by the control value acquisition unit 822. Specifically, the control value selector 823 stores the finally selected control value in the control value storage unit 824, and selects a control value having the least difference value with the control value stored therein.

In this manner, the deformable elements 14*c* can be appropriately deformed in a short period of time, by selecting a lowest control value of deformation, and thus realizing the improvement of processing capabilities of the magnetic disk device 1.

The control value selector 823 and the position controller 810 may be configured to select a control value to minimize the seek difference of the heads 14, instead of selecting a lowest value of deformation. If the seek difference of the heads 14 is reduced, the processing capabilities of the magnetic disk device 1 can be improved.

The deformable element controller 825 applies the control value selected by the control value selector 823 to the deformable element 14*c* so as to control their deformation.

Figure 9:
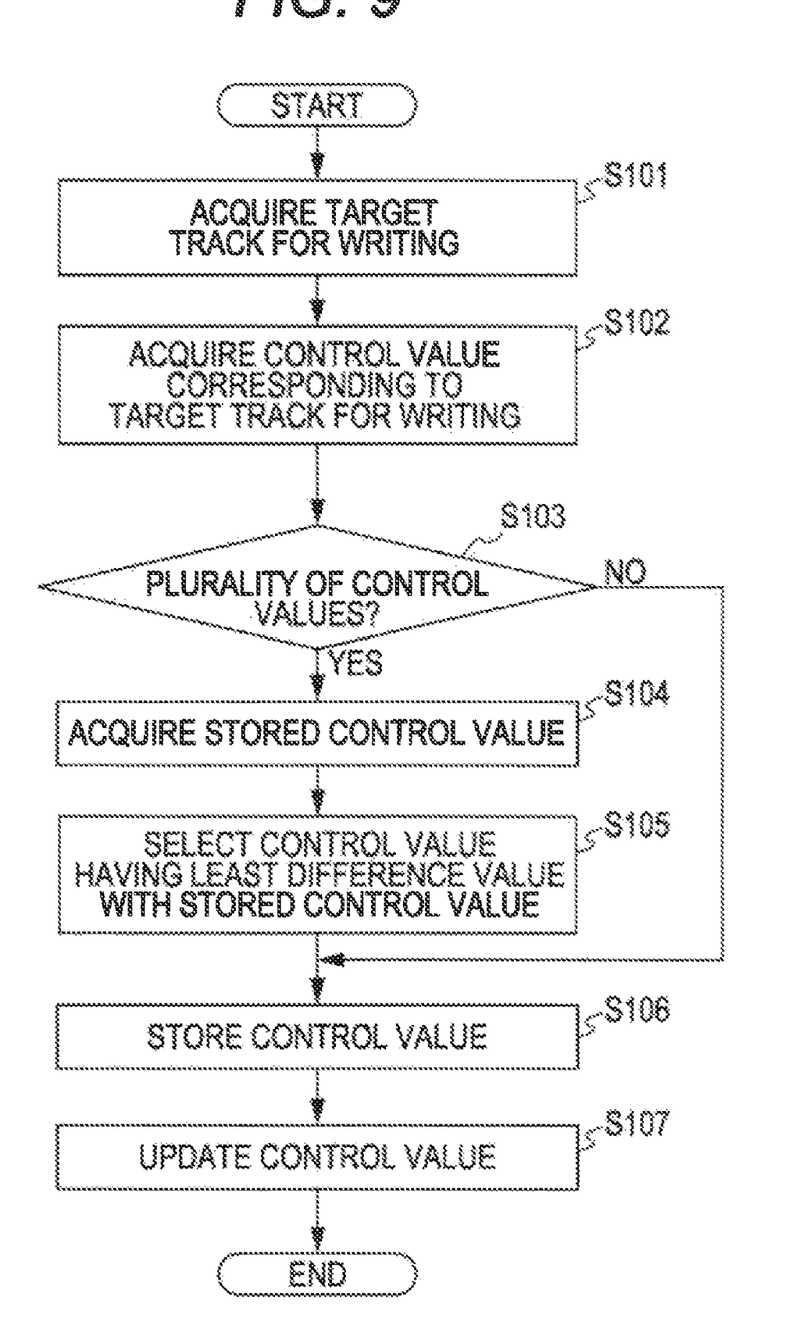
FIG. 9 is a flowchart showing operations of the magnetic disk device according to the first embodiment.

Descriptions will now be made of an operation for controlling the deformation of the deformable element 14*c* which is performed in the magnetic disk device 1. FIG. 9 is a flowchart showing the operation of the magnetic disk device 1 of this embodiment. This operation is executed every time the writing operation is performed.

As shown in the illustration, the target track acquisition unit 821 acquires a target track for the writing operation from the position controller 810 (Step S101). The control value acquisition unit 822 refers to the control value management table 910 so as to acquire a control value for the deformable element 14*c* corresponding to the target track (Step S102).

It is possible to obtain a control value by calculating the control value of the acquired target track, instead of referring to the control value management table which keeps control values of target tracks.

If a plurality of control values were acquired (Yes in Step S103), the control value selector 823 acquires the present control value stored in the control value storage unit 824 (Step S104), and selects a control value having the least difference value with the acquired control value (Step S105). The control value selector 823 stores the selected control value in the control value storage unit 824 (Step S106). The deformable element controller 825 updates the control value to be applied to the deformable elements 14*c* (Step S107).

If only one control value was acquired in Step S102 (No in Step 103), the control value selector 823 stores the acquired control value in the control value storage unit 824 (Step S106). The deformable element controller 825 updates the control value to be applied to the deformable element 14*c* (Step S107).

As described above, in embodiment 1, there is provided the deformable elements 14*c* for changing the distance between the read head elements 14*a* and the write head elements 14*b*, in order to control the distance therebetween by changing the control value to be applied to the deformable elements 14*c* in association with each track for the writing. As a result, a storage medium device can be stably operated, regardless of the change in the yaw angle which occurs with the change of the target track for writing.

The magnetic disk device 1 may include means for optimizing the control values stored in the control value management table 910. Specifically, the device may include means for changing the control value to be applied to the deformable elements 14*c* by a predetermined width, and replacing such a control value as to obtain the highest S/N ratio of the signal to be read by the read head elements 14*a* with a present control value, and storing the control value in the control value management table 910.

Due to this configuration, the contents of the control value management table 310 can be optimized such that the read head elements 14*a* are on-track on any track, regardless of the individual difference. In this case, the control value management table 910 may be configured to keep control values corresponding to each surface of the magnetic disk 15, in order to improve the control accuracy.

The above operation for optimizing the control values may be performed before the shipment of the magnetic disk device 1, may periodically be performed during the operation of the magnetic disk device 1, or may be performed while the magnetic disk device 1 is idle.

2. Second Embodiment

As described above, in the magnetic disk device using the patterned media, the timing at which the write head element 14b performs a writing operation is control led based on a clock signal generated in synchronism with a reading signal of read head element 14a.

Figure 10:
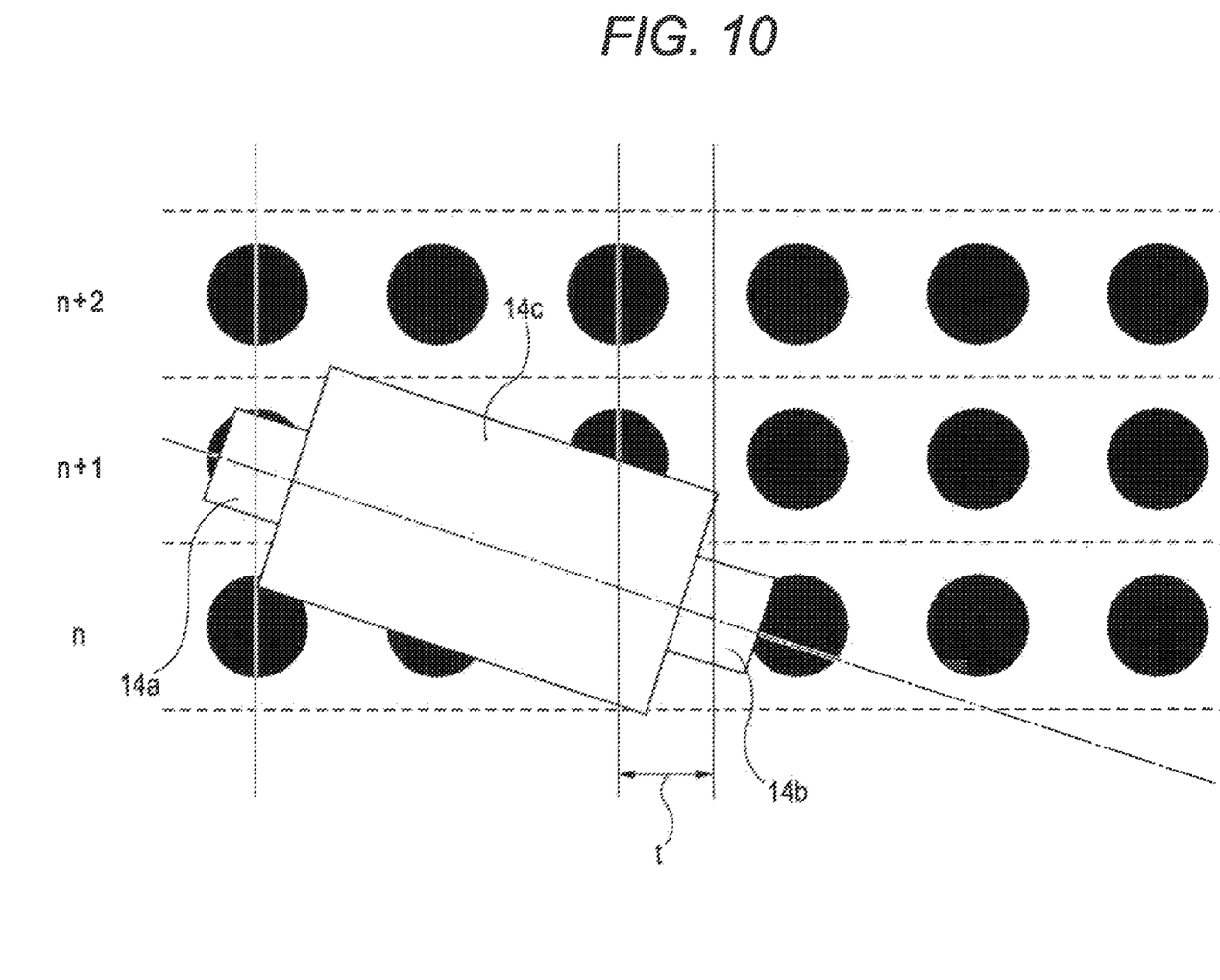
FIG. 10 is a diagram showing a state of a head in a case where writing is performed on the track "n"

In this case, as shown in FIG. 10, the timing at which the read head element 14a is positioned on the magnetic particles delays from the timing at which the write head element 14b is positioned, on the magnetic particles. Thus, it is necessary that the write head element 14b perform the writing operation after a delay t since the clock signal is generated in synchronism with a reading signal of read head element 14a.

If the distances between the read head element 14a and the write head element 14b do not change, the delay value t changes in accordance with the change in the yaw angle that occurs as the head 14 moves. Thus, the magnetic disk device 1 is forced to implement complicated control. To avoid this, in this embodiment, the deformable element 14c is so controlled that a constant delay value t can be achieved.

Figure 11:
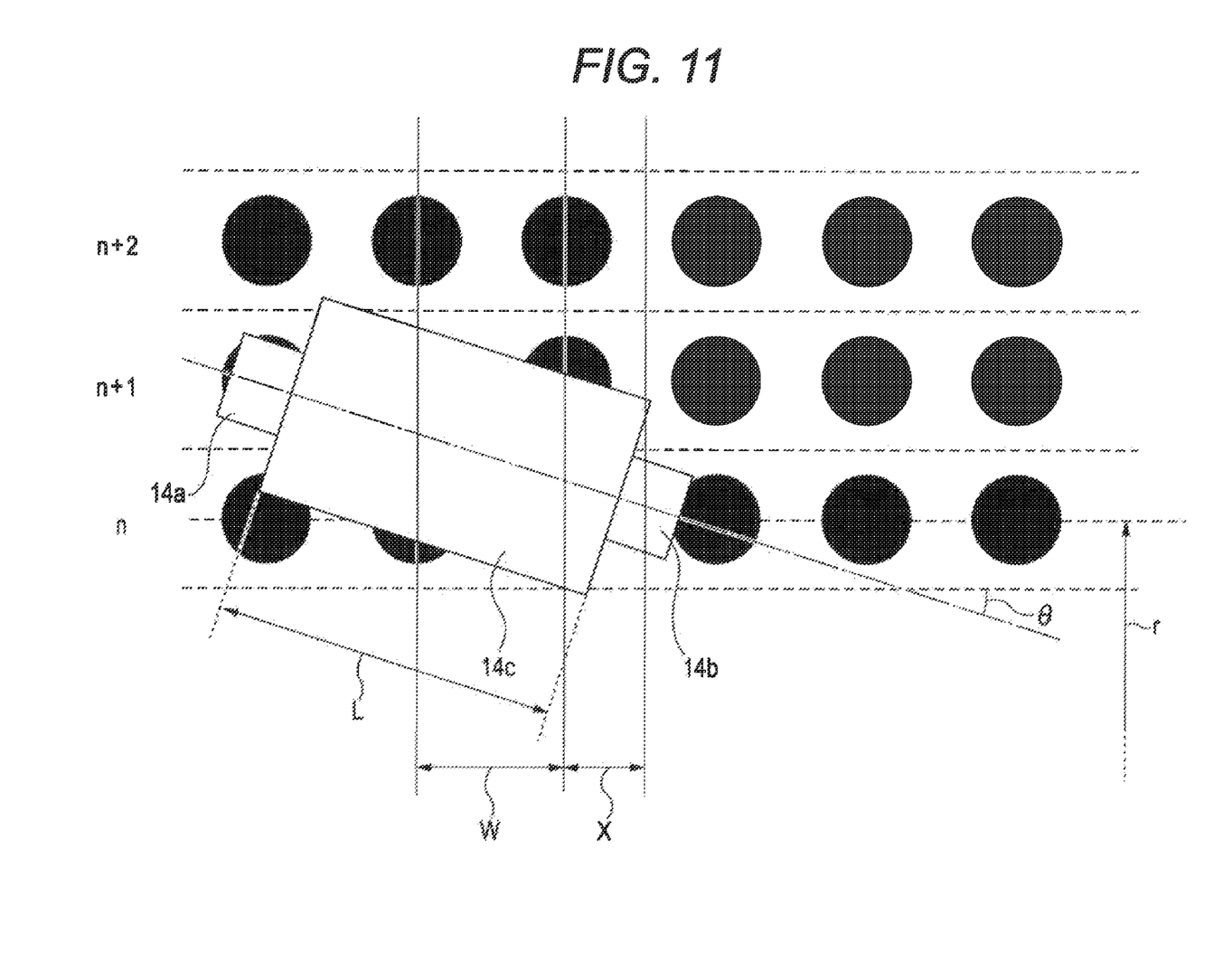
FIG. 11 is a diagram showing parameters for obtaining a delay value.

Descriptions will now be made of a method for obtaining a deformation value of the deformable element 14c that is necessary for achieving a constant delay value t, with reference to FIG. 11. The delay value t can be expressed by an equation:

$$t = x/v,$$

where v is the circumferential speed of the magnetic disk 15 on a target track, and x is the distance between the write head element 14b and the target magnetic particle for writing when the read head element 14a is positioned on the magnetic particles.

The circumferential, speed v is expressed by an equation:

$$v = 2\pi r \times N/60,$$

where r is the distance from the center of the magnetic disk 15 to the target track, and N (rpm) is the number of revolutions of the magnetic disk 15.

The distance x can be expressed by an equation:

$$x = L \cos\theta - (m+1)w,$$

where L is the distance between the read head elements 14a and the write head elements 14b, $\theta$ is the yaw angle, w represents the intervals between the magnetic particles in the circumferential direction, and m is the number of magnetic particles existing between the magnetic particle under the read head element 14a and the target magnetic particle for writing.

Hence, the delay value t is expressed, by an equation:

$$t = (L \cos\theta - (m+1)w)/(2\pi r \times N/60).$$

Transformation of this equation results in an equation:

$$L = (t \times 2\pi r \times N/60 + (m+1)w)/\cos\theta.$$

By putting values of t, r, and $\theta$ into this equation, this equation provides the deformation volume of the deformable element 14c corresponding to each target track.

Figure 12:
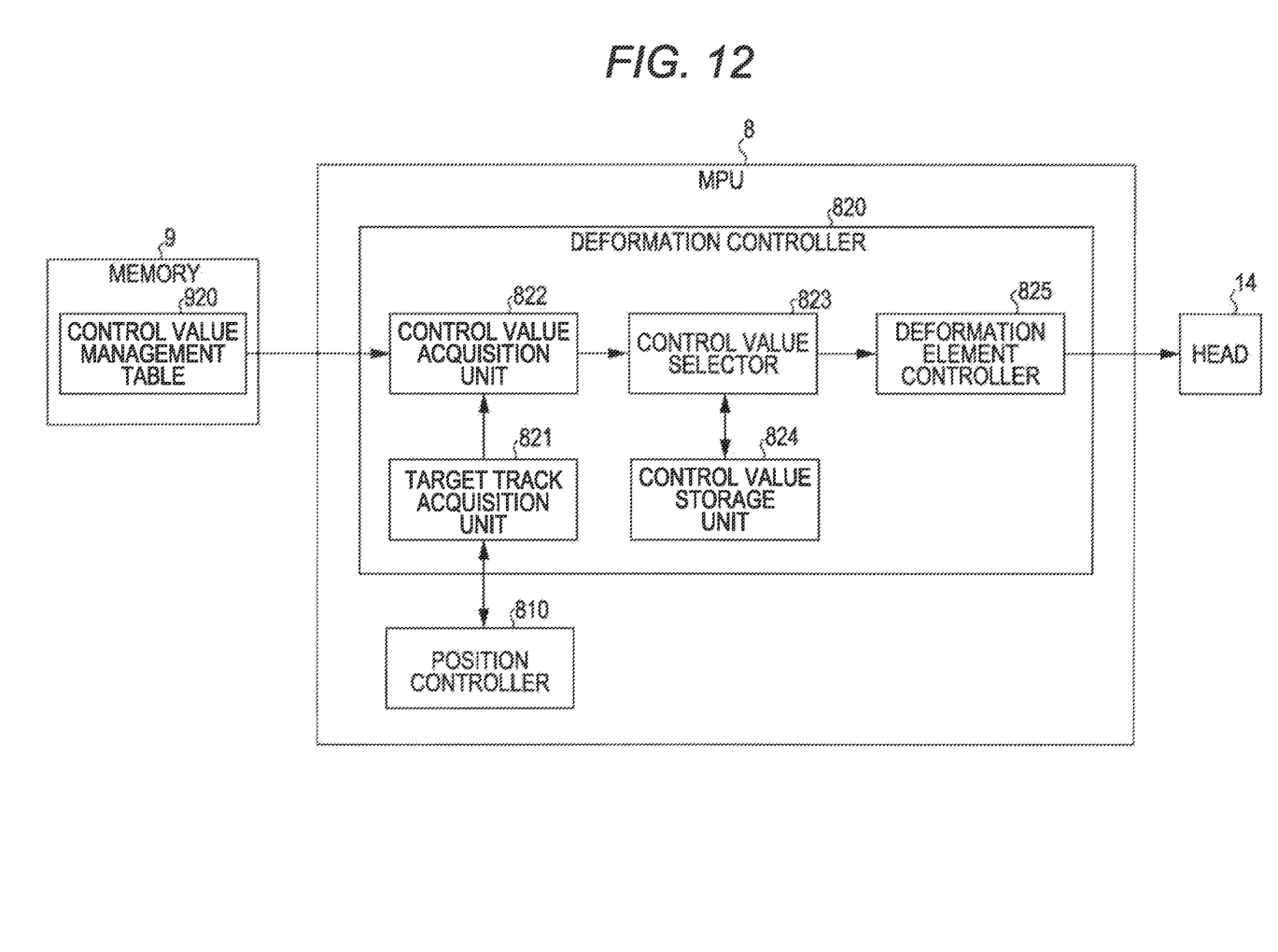
FIG. 12 is a diagram showing a configuration of the main part of a magnetic disk device according to a second embodiment.

Descriptions will now be made of the configuration of the magnetic disk device 1 according to this embodiment. FIG. 12 is a diagram showing a configuration of the main part of the magnetic disk device 1 according to this embodiment. As shown in the illustration, the magnetic disk device 1 of this embodiment, has the same configuration and operates the same as that shown in FIG. 7, except that the control value management table 910 is replaced by a control value management table 920.

The control value management table 920 keeps control values provided by the above equations. These values are corresponding to each target track. The table 920 has the same configuration as that of the control value management table 310 shown in FIG. 8.

As described above, in embodiment 2, the deformable element 14c was controlled by the manner, the difference between the delay of the timing at which the read head element 14a reads the signal and the delay of the timing at which the write head element 14b performs the writing is uniform. Thus, the writing can be performed in an appropriate position without complicated control of the timing at which the write head element 14b performs the writing.

In the above embodiment, control values of the deformable elements 14c to obtain the constant delay value t are obtained in advance, and are stored in the control value management table 920. However, the control value may be dynamically obtained. That is, the distances between the read head elements 14a and the write head elements 14b may be calculated using the above equations at the writing operation, and the control values of the deformable elements 14c may be acquired by referring to the table.

In this manner, if the control value is thus dynamically obtained, a constant delay value t can be maintained, even if the number N of revolutions of the disks changes.

In the above embodiments, the functions of the deformation controller 820 are implemented as the firmware (program) executed by the MPU 8. However, the functions of the deformation controller 820 may be implemented as a deformation controller device, etc. in the form of hardware. The present technique has been described to be effective for the patterned medium. However, the technique can be applied similarly to the general medium.

According to the above-described present technique, the deformable element changes the distances between the read head element and the write head element, in order to control the distances between the read head element and the write head element by changing the control value to be applied to the deformable element in association with each target track for writing. Thus, the storage medium device can stably be operated, regardless of the change in the yaw angle which occurs as the target track for writing changes.

According to the present techniques, the deformable element is so controlled that the read head element is on-track on any track at the writing operation. Therefore, the positioning control can stably be performed based on the signal read by the read head element, thus improving the writing accuracy by the write head element.

The deformable element is so controlled that the difference between the timing at which the read head element reads the signal and the timing at which the write head element performs the writing operation is uniform. As a result, the writing operation can be implemented in an accurate position without performing the complicated control of the timing at which the write head element performs the writing operation.

When alternatives are available in the control value to be applied to the deformable element, control values that attain the least deformation values of the deformable element have been selected, thus realizing high-speed operations.

Further, there are provided; the deformable element for changing the distance between the read head element and the write head element; and the deformation controller device for controlling the device. In this configuration, the control value to be applied to the deformable element is changed in association with each target track for writing, in order to control the distances between the read head element and the write head element. As a result, the storage medium device can stably be operated, regardless of the change in the yaw angle which occurs as the target track for writing changes.

The constituent elements of the present technique, expressions or any arbitrary combination of the constituent elements may be applied to any corresponding method, device, system, computer program, recording medium, or data configuration. Thus, such elements, expressions or arbitrary combination thereof are effective as embodiments of the present technique.

According to the present technique, the deformable element changes the distance between the read head element and the write head element, in order to control the distance between the read head element and the write heads element by changing the control value to be applied to the deformable element in association with each target track for writing. Therefore, the storage medium device can stably be operated, regardless of the change in the yaw angle which occurs as the target track for writing changes.

According to the present technique, the storage medium device, the deformation controller device and the head slider all are useful for controlling the head, and, particularly, are suitable when it is necessary to stably operate the storage medium device regardless of the change of the yaw angle.

What is claimed is:

1. A storage medium device having at least a head which includes a read head element and a write head element, the device comprising:
   a deformable element which changes a distance between the read head element and the write head element in a circumferential direction;
   a storage unit which stores a control value to be applied to the deformable element in association with each target track for writing; and
   a deformation controller which acquires the control value corresponding to the target track for the writing from the storage unit, and applies the acquired control value to the deformable element.

2. The storage medium device according to claim 1, wherein
   the storage unit stores a control value for controlling the deformable element so that the read head element is positioned on any track, when the write head element is positioned on the target track selected for writing.

3. The storage medium device according to claim 2, wherein
   the deformation controller selects a control value having a least difference value with a present control value, when a plurality of control values corresponding to the target track selected for writing are acquired from the storage unit.

4. The storage medium device according to claim 2, wherein
   the deformation controller selects a control value for obtaining a minimum seek difference, when a plurality of control values corresponding to the target track selected for writing are acquired from the storage unit.

5. The storage medium device according to claim 2, further comprising:
   a control value optimizer which obtains such a control value as to obtain a highest S/N ratio of a signal to be read by the read head element, when the write head element is positioned on a certain track, and stores the obtained control values in the storage unit in association with the track on which the write head element is positioned.

6. The storage medium device according to claim 1, wherein
   the storage unit stores a control value for controlling the deformable element so that the difference between the timing at which the read head element reads a signal and a timing at which the write head element performs the writing is uniform, in association with each target track selected for writing.

7. The storage medium device according to claim 6, wherein
   the deformation controller selects a control value having a least difference value with a present control value, when a plurality of control values corresponding to the target track selected for writing are acquired from the storage unit.

8. The storage medium device according to claim 6, wherein
   the deformation controller selects a control value for obtaining a minimum seek difference, when a plurality of control values corresponding to the target track selected for writing are acquired from the storage unit.

9. The storage medium device according to claim 6, further comprising:
   a control value optimizer which obtains such a control value as to obtain a highest S/N ratio of a signal to be read by the read head element, when the write head element is positioned on a certain track, and stores the obtained control value in the storage unit in association with the track on which the write head element is positioned.

10. The storage medium device according to claim 1, wherein
    the deformation controller selects a control value having a least difference value with a present control value, when a plurality of control values corresponding to the target track selected for writing are acquired from the storage unit.

11. The storage medium device according to claim 1, wherein
    the deformation controller selects a control value for obtaining a minimum seek difference, when a plurality of control values corresponding to the target track selected for writing are acquired from the storage unit.

12. The storage medium device according to claim 1, further comprising:
    a control value optimizer which obtains such a control value as to obtain a highest S/N ratio of a signal to be read by the read head element, when the write head element is positioned on a certain track, and stores the obtained control value in the storage unit in association with the track on which the write head element is positioned.

13. A deformation controller device for controlling a deformable element provided for changing a distance between a read head element and a write head element in a circumferential direction, in a storage medium device having at least a head which includes the read head element and the write head element, the deformation controller device comprising:
    a target track acquisition unit which acquires information regarding a target track for writing;
    a control value acquisition unit which acquires a control value corresponding to the track included in the information acquired by the target track acquisition unit from a storage unit which stores a control value to be applied to the deformable element in association with each target track; and a deformable element controller which applies the control value acquired by the control value acquisition unit to the deformable element.

14. The deformation controller device according to claim 13, further comprising:
a control value selector which selects a control value having a least difference value with a present control value, when a plurality of control values corresponding to the target track are acquired by the control value acquisition unit.

15. The deformation controller device according to claim 13, further comprising:
a control value selector which selects a control value for obtaining a minimum seek difference, when a plurality of control values corresponding to the target track are acquired by the control value acquisition unit.

* * * * *